C. J. DALTON.
OVERSIZED TRUCK TIRE.
APPLICATION FILED JULY 20, 1921.
1,405,973. Patented Feb. 7, 1922.
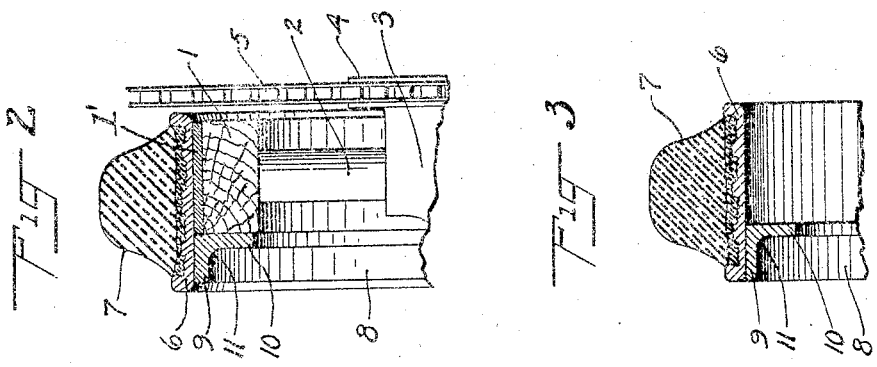
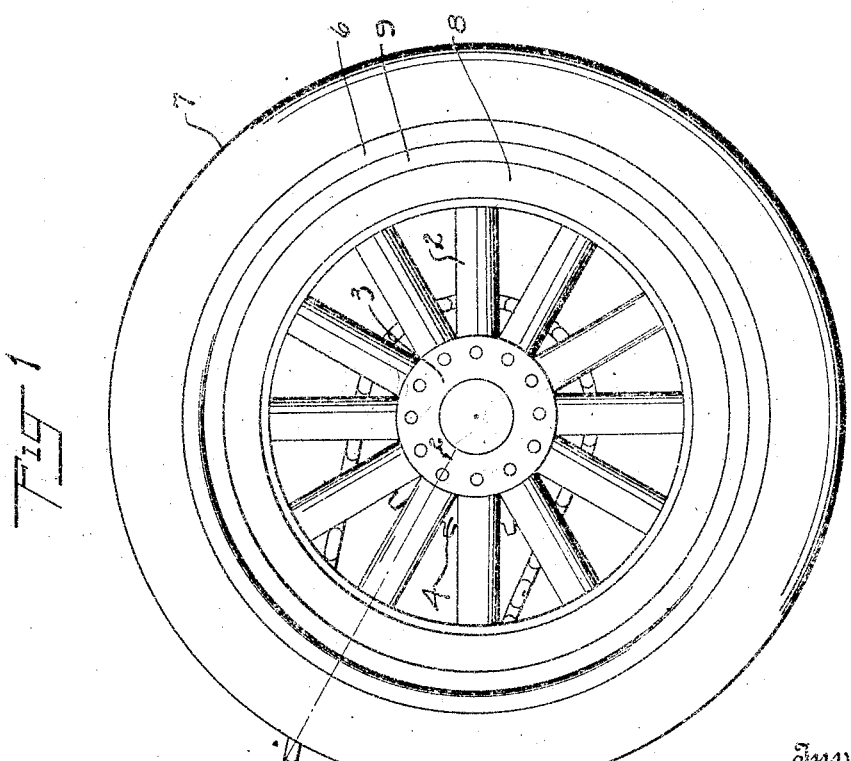

UNITED STATES PATENT OFFICE.

CHARLES J. DALTON, OF NEW YORK, N. Y.

OVERSIZED TRUCK TIRE.

1,405,973.  Specification of Letters Patent.  Patented Feb. 7, 1922.

Application filed July 20, 1921. Serial No. 486,170.

*To all whom it may concern:*

Be it known that I, CHARLES J. DALTON, a citizen of the United States of America, residing at the city, county, and State of New York, have invented new and useful Improvements in Oversized Truck Tires, of which the following is a specification.

This invention relates to tires especially adapted for use on trucks.

It has been found that in practice trucks are often loaded beyond the weights which they are rated to carry. This is very hard upon the whole truck structure, as it is not designed for such heavy duty, but it is especially hard upon the tires where the wear and strain is most acute. To relieve this undue strain upon the tires, it has been proposed to over-size them. That is to say a tire of a larger size than that for which the wheel of the truck in question is designed is placed upon the wheel and so the over-loading of the truck is relieved to some extent so far as the tires are concerned. Placing the tire, however, upon the wheel which is smaller than it is designed for causes an overhang of the tire beyond the felly of the wheel. This overhang has heretofore been limited so that the full benefits from over-sizing could not be obtained for a number of reasons. Among these may be mentioned that were the tire made to overhang to a considerable extent, it would be liable to be bent in on coming in contact with the street curb or in other ways, and when this occurs the metal tire rim is likely to be torn loose from the rubber tread mounted upon it so that an entrance for water, gravel, etc., is afforded and rapid deterioration of the tire results. Furthermore the driving means for the truck, the body or other structures are apt to closely approach the wheel upon the inside thereof so that the tire cannot be made to overhang upon the inside of the wheel to any considerable extent without coming against some of these structures which, of course, is intolerable.

According to the present invention, I provide a tire which has a re-inforced overhanging portion so that it may have a large overhang beyond the edge of the wheel felly without being subject to such dangers as have been indicated, and furthermore the overhang of the tire may be at the outer side of the wheel only and the objectionable overhang on the inside of the wheel may be avoided.

This invention permits of over-sizing the tires of truck wheels in a secure and reliable manner.

Other and ancillary objects of the invention will appear hereinafter.

In the accompanying drawings which illustrate the invention—

Fig. 1 is a side elevation of a wheel to which the invention is applied;

Fig. 2 is a partial section on the line 2—2 of Fig. 1; and

Fig. 3 is a view similar to Fig. 2 but with the wheel omitted showing the tire by itself.

Referring to the drawings, the wheel may be of usual construction comprising the wood felly 1, the metal felly or band 1', spokes 2 and hub 3 which is driven by means of a sprocket wheel 4 secured to the wheel hub and driven by means of a chain 5 in any suitable or well known manner.

It will be seen that the chain passes in close proximity to the felly.

Mounted upon the wheel by force-fitting it thereon is a tire comprising a metal tire rim 6 upon which is mounted a rubber tread 7, the tread 7 being secured to the tire rim 6 in ways well known in the art. It will be seen that the tire rim 6 overhangs the felly 1 at the outer side of the wheel and to reinforce it a ring 8 of right angular cross section is forced by hydraulic pressure within it, the outer edge of this ring being substantially flush with the outer edge of the metal tire rim, it not being material whether it be slightly within or slightly without the tire rim but is substantially flush with it.

The side 9 of the angular ring bears against the tire rim 6 while the side 10 at right angles thereto, acts similar to the web of a railroad rail or I-beam in resisting the bending of the ring. To extend this re-inforcement more fully to the width of the side 9, a fillet 11 is placed within the angle of the two sides 9 and 10, the efficiency of the reinforcement being greatly enhanced thereby.

While the invention has been illustrated in what is considered its best application it may have other embodiments without departing from its spirit and is not, therefore, limited to the structures shown in the drawings.

What I claim is:

1. An over-sized truck tire comprising a metal tire rim forming a base for a rubber tread, a rubber tread thereon and an annular reinforcing ring of angular cross section forced within said tire rim and having an edge substantially flush with the edge of said tire rim.

2. An over-sized truck tire comprising a metal tire rim forming a base for a rubber tread, a rubber tread thereon and an annular reinforcing ring of angular cross section forced within said band at one side thereof.

3. The combination with a wheel, of an over-sized tire thereon and having an overhanging portion extending beyond the same laterally, said tire comprising a metal tire rim forming a base for a rubber tread, a rubber tread upon said tire rim and a reinforcing ring forced within said tire rim alongside the felly, the outer edges of said tire rim and ring being substantially flush.

4. The combination with a wheel, of an over-sized tire thereon and having an overhanging portion extending beyond the same laterally, said tire comprising a metal tire rim forming a base for a rubber tread, a rubber tread upon said tire rim and a reinforcing ring forced within said tire rim alongside the felly, the outer edges of said tire rim and ring being substantially flush, said reinforcing ring being angular in cross section.

5. The combination with a wheel, of an over-sized tire thereon and having an overhanging portion at one side only of said wheel and extending beyond the same laterally, said tire comprising a metal tire rim forming the base for a rubber tread, a rubber tread thereon, and an annular reinforcing ring within the overhanging portion of said tire rim.

6. The combination with a wheel, of an over-sized tire thereon and having a portion overhanging the felly upon the outer side thereof only, said tire comprising a metal tire rim forming a base for a rubber tread, a rubber tread thereon and a re-inforcing ring of angular cross section within said overhanging portion of the tire and upon the outer side only of said felly.

7. The combination with a wheel, of an over-sized tire thereon and overhanging the felly at the outer side thereof only, said tire comprising a metal tire rim forming a base for a rubber tread, a rubber tread thereon and a re-inforcing ring of angular cross section forced within the overhanging portion of said tire rim and having an edge substantially flush with the outer edge of said tire rim, said ring having a fillet between its angularly related sides.

In testimony whereof I have signed this specification this 21st day of May 1921.

CHARLES J. DALTON.